April 4, 1939.  C. R. PATON  2,152,660
MOTOR VEHICLE
Filed Nov. 22, 1933  3 Sheets-Sheet 1
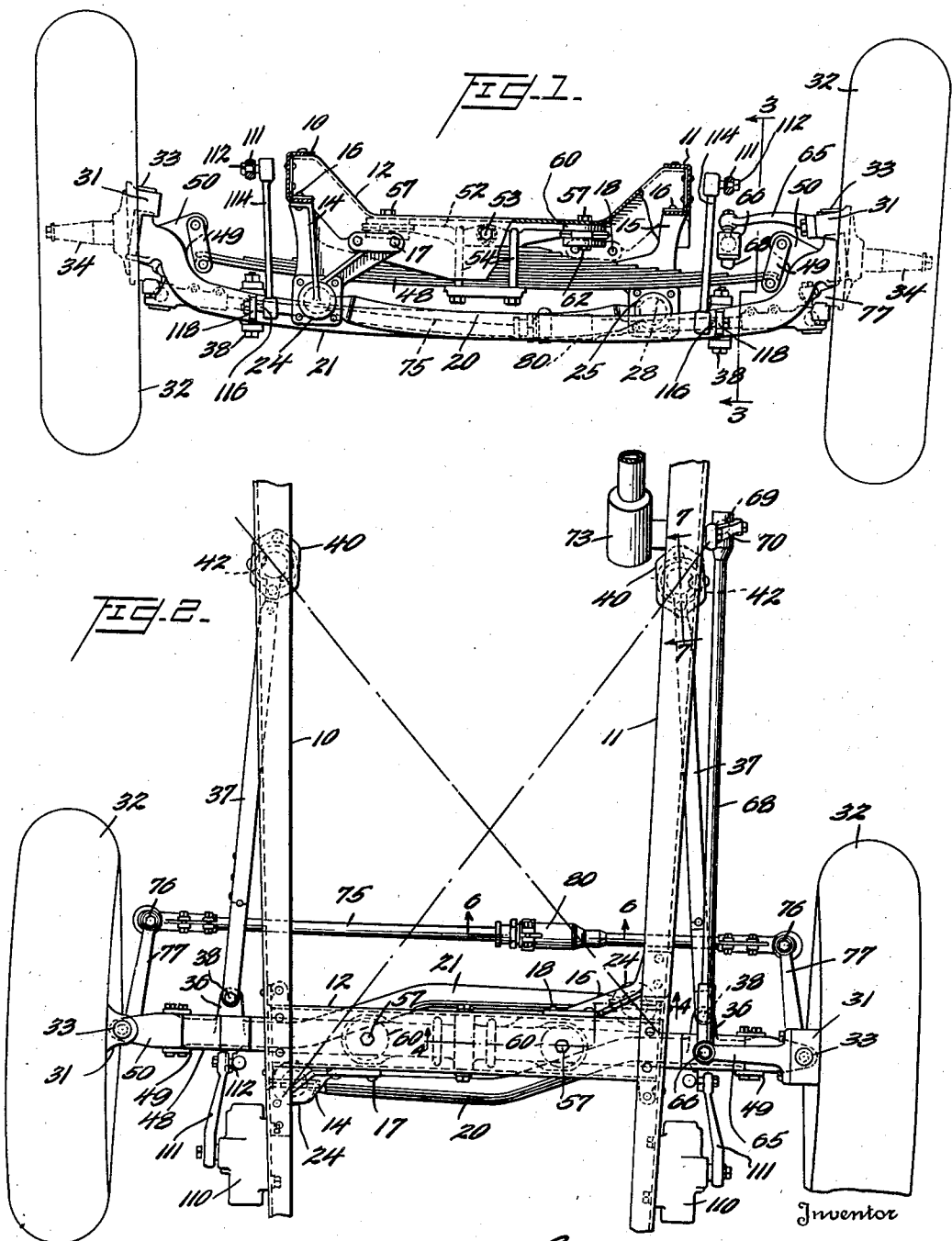

April 4, 1939.  C. R. PATON  2,152,660
MOTOR VEHICLE
Filed Nov. 22, 1933  3 Sheets-Sheet 2
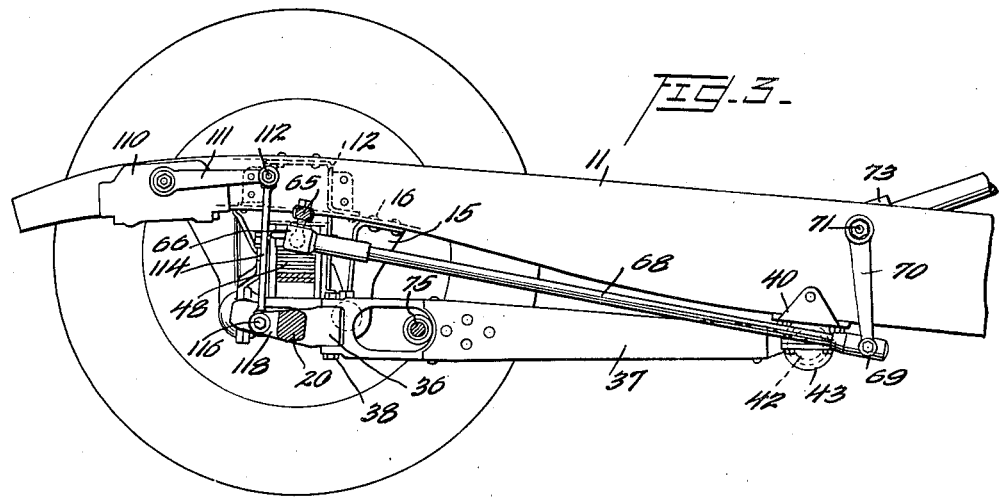
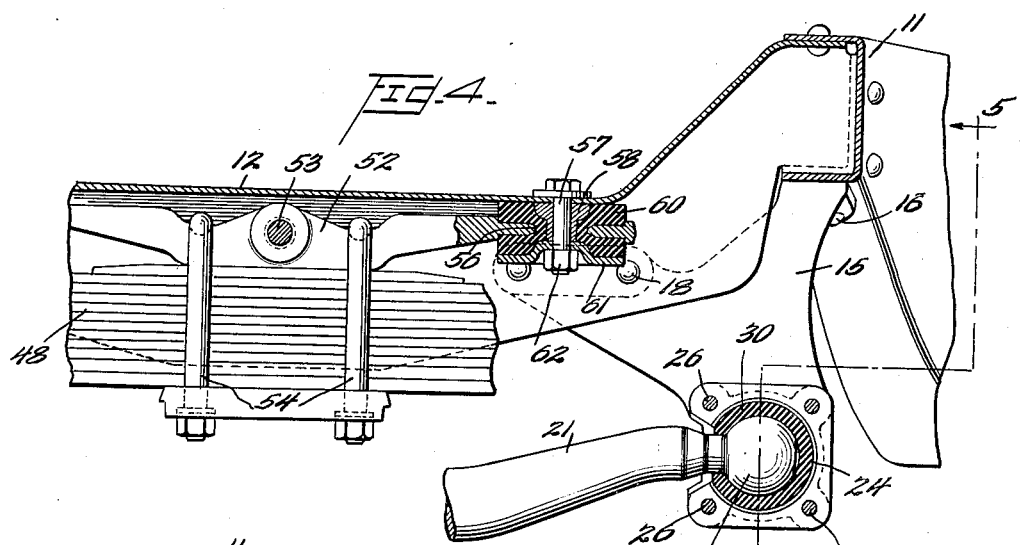
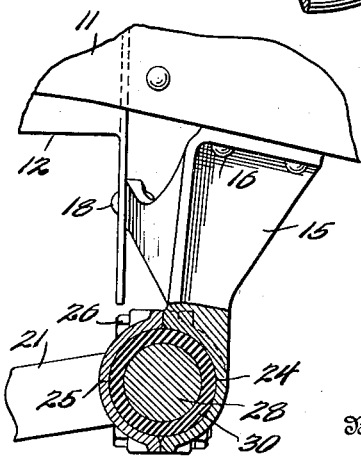
Inventor
Clyde R. Paton,
By Watson, Cole, Morse & Grindle.
Attorney April 4, 1939.                    C. R. PATON                      2,152,660
                                 MOTOR VEHICLE
                              Filed Nov. 22, 1933              3 Sheets-Sheet 3
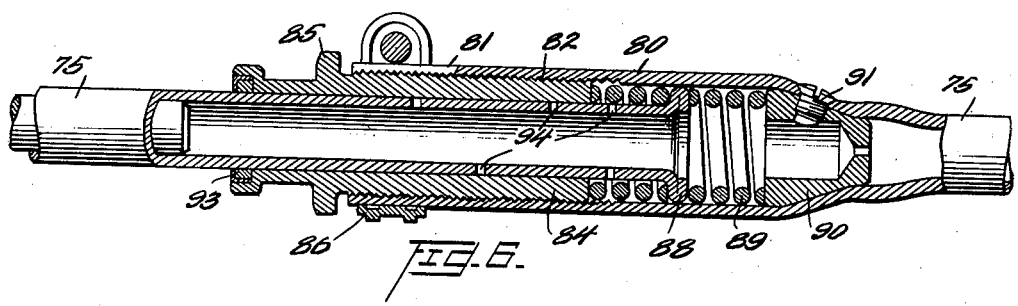
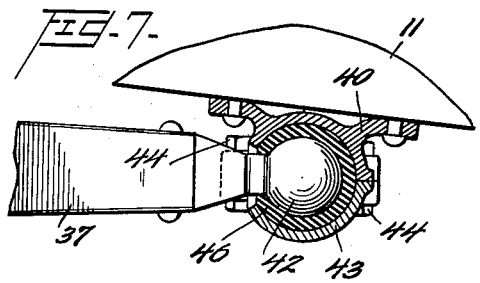
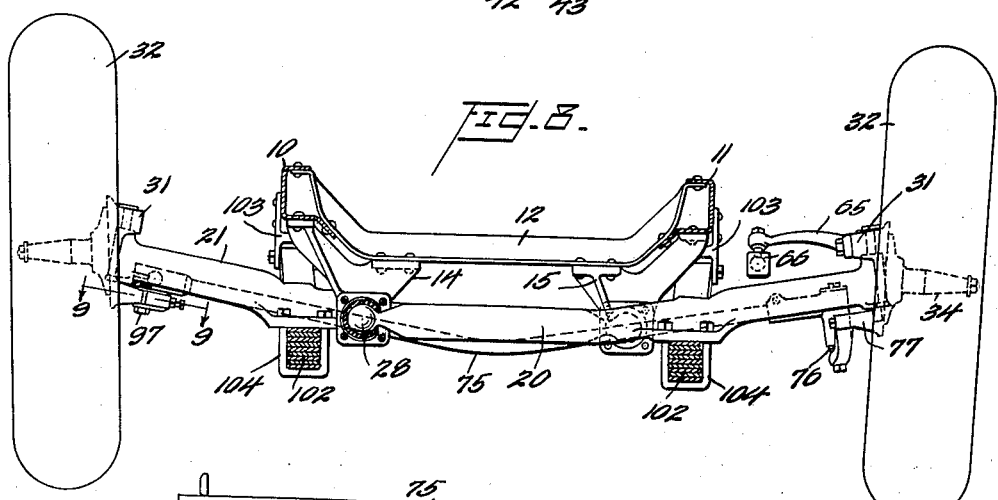
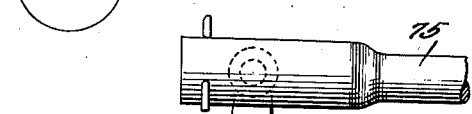
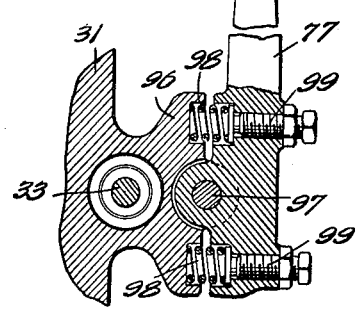
Inventor
Clyde R. Paton,
By Watson, Coit, Morse
& Grindle,
Attorney Patented Apr. 4, 1939

2,152,660

UNITED STATES PATENT OFFICE 2,152,660

MOTOR VEHICLE

Clyde R. Paton, Birmingham, Mich., assignor to Packard Motor Car Company, Detroit, Mich., a corporation of Michigan Application November 22, 1933, Serial No. 699,278

8 Claims. (Cl. 280—95)

This invention relates to motor vehicles and more particularly to improvements in vehicles of the type in which the road wheels are independently sprung from the vehicle frame. It is the principal object of the invention to provide a wheel supporting structure which will materially improve the riding qualities of the vehicle and the ease with which steering may be effected.

As the result of the constant improvement of motor vehicle construction permitting extremely high maximum speeds, a need has developed for wheel suspensions which are more readily adaptable to varying road conditions than has heretofore been found necessary, particularly in connection with the heavier and faster vehicles, and the use of suspensions in which the road wheels are permitted independent movement offers one solution of the problem. This type of wheel suspension has been long used successfully in Europe where it has been found desirable because of poor road conditions, but little attempt has been made to introduce it in this country where rough roads are very infrequently encountered. Unfortunately, many difficulties have arisen in applying the principles of independent wheel suspension employed in European countries to the heavier vehicles which are capable of operation at extremely high speeds under the road conditions which obtain in this country, and considerable modification of accepted European practice has been found necessary. Thus difficulty has been encountered as the result of excessive side sway of vehicles operated at high speed and the adoption of independent spring suspensions of the type heretofore proposed has not in general proven successful in eliminating synchronous action between the steerable road wheels which is probably largely responsible for shimmy. Furthermore, in development of wheel suspensions abroad relatively little thought has been given to the steering mechanism and correct steering geometry has been the exception rather than the rule.

It is the purpose of the present invention to overcome these and other difficulties hitherto encountered in the adaptation of independent wheel suspension to modern conditions. To this end it is proposed as a part of the present invention to employ in the preferred embodiment thereof separate transversely extending axles pivotally supported on the vehicle frame, each axle being allocated to and supporting a single road wheel, the length of the axles being sufficient to ensure a relatively small curvature of the arcuate path of travel in the rise and fall of the road wheels during movement over an uneven road bed. It is a feature of the invention that each axle is isolated from the frame by means of a shock absorbing device in such manner as to prevent transmission of vibrations through the frame from one wheel to the other and the resultant development of the synchronous action between the two wheels as hereinbefore referred to.

It is a further feature of the invention that the entire wheel suspension is isolated from the frame and that the wheel assemblies are isolated from each other by vibration absorbing devices in order that vibrational disturbances originating in the road wheels may not build up to disturbing proportions. Thus one embodiment of the invention contemplates the employment of a transversely extending leaf spring acting between the frame and road wheels for resisting vertical movement of the latter, this spring being so anchored to the frame as to rock about a longitudinal axis, any rocking movement being resisted by vibration absorbing means.

A further object of the invention is the provision, in connection with the steerable road wheels of a vehicle, of mechanism for steering the wheels which is so disposed with respect to the path of movement of the wheels as they swing upwardly on meeting an obstruction that the wheel movement does not effect improper relative displacement of the several parts of the steering mechanism; in other words, it is a feature of the invention that substantially perfect steering is obtained. The transmission of shock from the road wheels to the steering column is thus avoided and the steering movement of the wheels may be properly controlled regardless of the nature of the road surface over which the vehicle is passing.

Further objects and features of the invention will be apparent from the following description taken in connection with the accompanying drawings, in which Figure 1 is a transverse section of a motor vehicle frame illustrating one form of suspension constructed in accordance with the principles of the invention;

Figure 2 is a plan view of a portion of a vehicle frame corresponding to Figure 1;

Figure 3 is a longitudinal section on the line 3—3 of Figure 1;

Figure 4 is a fragmentary transverse section taken substantially on the line 4—4 of Figure 2;

Figure 5 is a fragmentary sectional view on the line 5—5 of Figure 4;

Figure 6 is a sectional view on the line 6—6 of Figure 2;

Figure 7 is a fragmentary sectional view taken substantially on the line 7—7 of Figure 2;

Figure 8 is a transverse sectional view corresponding to Figure 1 but showing a slightly modified form of the invention; and Figure 9 is a sectional view on the line 9—9 of Figure 8.

In describing the invention, reference will be made to the drawings in which the invention has been illustrated as applied to a suspension for the steerable road wheels of a vehicle. It will nevertheless be understood that no restriction of the invention is thereby contemplated since it is apparent that various features of the invention are equally as applicable to road wheels which are not steerable. It will also be appreciated that while the various elements disclosed in the drawings are described hereinafter by specific language, no limitation of the invention is thereby intended, a detailed description being given primarily to facilitate an understanding of the principles underlying the invention.

Referring first to the form of the invention shown in Figures 1 to 7 inclusive, it will be observed that the side frame members 10 and 11 of the vehicle are connected adjacent their forward ends by a cross frame member 12, these members being of the usual channel section. Brackets 14 and 15 riveted or otherwise secured to the side frame members 10 and 11 as at 16 and to the forward and rearward sides respectively of the cross frame member 12 as at 17 and 18 depend from the frame and serve as fulcrums for the axles 20 and 21 respectively. It will be observed that the lower end of the bracket 14 is located forwardly of and the lower end of the bracket 15 is located rearwardly of the cross frame member 12, and the axles are bent as illustrated in Figure 2 to avoid interference, the axle 20 lying for the most part to the front and the axle 21 lying for the most part to the rear of the cross frame member 12 when viewed in plan.

The manner in which each axle is fulcrumed in the associated bracket is illustrated more particularly in Figures 4 and 5 of the drawings. Thus the lower end of each bracket may be constructed to provide a substantially spherical seat 24 and a complementary cap member 25 having a substantially spherical inner face is bolted or otherwise secured to the bracket as at 26. Each axle end is provided with a spherical head 28 which is received within the spherical socket thus afforded, a liner 30 composed wholly or in part of rubber or similar material being interposed between the head 28 of the axle and the socket. In practice the cooperating parts are so dimensioned that the application of the cap member 25 to the bracket after the axle end and the rubber sheath 30 have been properly positioned serves to compress the rubber to some extent, thereby rendering it more responsive in the damping of vibrations and ensuring an accurate fit between the parts.

Each axle is formed at its outer end to support one of the road wheels 32 for steering movement in the conventional manner about axes inclined slightly with respect to the vertical; for instance the usual king pin 33 may be provided, the wheel assembly including the steering knuckle 31 carrying the wheel spindle 34 being journalled on the king pin.

Each axle is further provided adjacent the outer end thereof with a rearwardly extending enlargement or boss 36, and radius rods or torque arms 37 extend substantially longitudinally of the frame at either side thereof and are pivoted at their forward ends to the respective bosses 36 for swinging movement about substantially vertical axes 38. At the rearward end each torque arm 37 is journalled for universal movement in the associated side frame member. For this purpose the construction shown in Figure 7 of the drawings may be employed, the arrangement being similar to that hereinbefore described for supporting the axles. Thus a bracket 40 may be secured to the lower side of each side frame member and the associated torque arm 37 may be provided with a spherical head portion 42 which is received in the spherical socket formed by the bracket 40 and the cap member 43 which is bolted at 44 to the bracket, a sheath of rubber 46 being interposed between the associated members.

In the form of the invention shown in Figures 1 to 4 inclusive of the drawings the movement in substantially vertical planes of the axles 20 and 21 in response to the normal rising and falling movement of the road wheels is resisted by a transversely extending leaf spring assembly 48 acting between the frame and the axles. Thus the outer ends of the leaf spring may be secured in the conventional manner by means of shackles 49 to arms 50 projecting inwardly from points adjacent the outer ends of the respective axles. A member 52 is fulcrumed adjacent the longitudinal center line of the vehicle, for instance by means of a bolt 53 passing through openings in the downwardly directed flanges of the cross frame member 12 and through the member 52 so that the latter is permitted a slight rocking movement about a substantially horizontal axis. The spring assembly 48 is secured to the member 52 by the usual spring clips 54. The laterally extended arms of the member 52 are yieldingly connected to the vehicle frame as shown more particularly in Figure 4 of the drawings, each arm being apertured as indicated at 56 to permit the passage therethrough of a bolt 57 and a bushing 58 surrounding the bolt, ample clearance being provided to permit of the introduction between the associated parts of a block 60 of rubber or similar deformable material. It will be observed that the rubber block 60 is clamped between a disk shaped element 61 and the inner face of the cross frame member 12, the element 61 being retained on the bolt 57 and in engagement with the bushing 58 by means of a nut 62. It will be appreciated that the rubber block 60 may be held under compression if necessary to ensure proper response to vibrational disturbances and that the construction effectively prevents the transmission to the frame of vibrations in the spring, the resultant rapid oscillation of the member 52 about its point of pivotal support on the frame causing deformation of the rubber blocks 60 and consequent dissipation of the energy of vibration in the form of heat.

It will be seen from the construction thus far described that each wheel is permitted to rise and fall independently of the other wheel about an axis connecting the points of pivotal support on the frame of the axle and the torque arm associated with that wheel. Each axle is mounted entirely below the frame and at a relatively low point, it being necessary only to ensure that proper road clearance will be obtained, and it is thus possible to reduce the tread variation of the wheel to a minimum. It will also be observed that the principal load is taken by the leaf spring at a point adjacent the wheel spindle, thus permitting the use of axles of relatively light construction.

On the application of brakes to a rapidly moving vehicle, there is a tendency to raise the rear end of the vehicle and depress the front end. By the employment of the construction described herein this tendency of the front end to dip is resisted and materially reduced. Thus when the brakes are applied to the front vehicle wheels the wheel assemblies tend to rotate about the point of contact of the wheel tread with the ground in a counterclockwise direction as viewed in Figure 3. This twisting movement is resisted in the present construction by the torque arms 37 and is transmitted through the point of connection of these torque arms to the frame, tending to elevate the frame at this point and to substantially reduce or eliminate the undesirable dipping effect.

Bolted or otherwise rigidly secured to the steering knuckle 31 of the road wheel 32 at the left-hand side of the vehicle is a steering knuckle arm 65 which is provided with the usual ball and socket connection 66 to a steering drag link 68, the latter having a similar connection 69 to the usual steering drop arm 70. The arm 70 is carried on a shaft 71 extending through the side frame and operable by the conventional steering gear enclosed in the housing 73. It is important in order to obtain accurate steering and to reduce to a minimum the tendency of the wheels to shimmy that the distance between the members to which the drag link 68 is connected be neither shortened or lengthened as the associated road wheel rises and falls. Thus the forward end of the drag link 68 should, in swinging about the point of connection between the drag link and the steering drop arm 70, execute an arc of movement which substantially coincides with the arc of movement executed by the outer end of the steering knuckle arm 65. It will be appreciated that the desired result may be obtained with the present construction by locating the point of connection 69 between the drag link 68 and the steering drop arm 70 substantially in the axis about which the associated road wheel 32 rises and falls, namely in the line connecting the points of pivotal support of the axle 20 and the torque arm 37 on the vehicle frame, this axis being indicated in Figures 2 and 3 of the drawings. By this means perfect steering is obtained, undesired movement of either road wheel about its steering axis as the vehicle rises and falls being avoided.

The two wheel assemblies are connected for conjoint steering movement by means of a tie rod 75 having the usual articulated connection at 76 with the steering arms 77 which are secured to or formed integrally with the knuckle members 31 of the road wheel assemblies. While the very considerable length of the supporting axles 20 and 21 and the torque arms 37 reduces to a minimum any error in steering which might arise from the employment of a tie rod construction of this type, it is found desirable to provide some yielding means in the connection between the two wheel assemblies to compensate for slight inaccuracy in the relationship of the parts. It is furthermore desirable to ensure that vibrations will not be transmitted through the tie rod 75 from one wheel to another and that no synchronous vibration resulting in shimmy of the wheels will be developed. For this purpose it is proposed to interpose in the connection between the two road wheel assemblies an elastic device.

In the form of the invention shown more particularly in Figures 2 and 6 this elastic device is inserted between the ends of the tie rod 75 and comprises a housing 80 which is split for a portion of its length as indicated at 81 and is threaded internally as shown at 82 to receive a threaded sleeve 84 having a flanged portion 85, by means of which it may be turned down within the housing 80. A clamping device indicated generally at 86 surrounding the split portion of the housing 80 retains the sleeve 84 against unintentional displacement within the housing 80. The housing 80 is preferably formed integrally with one end of the tie rod 75 and the other end of the tie rod extends within the housing, has a sliding fit within the sleeve 84, and is provided with an enlarged end 88 preferably produced by deformation. This enlarged end 88 of the tie rod lies between the convolutions of a coil spring 89, the latter abutting at one end against the sleeve 84 and at the other end against a sleeve 90, the latter being retained in the position indicated by means of a threaded element 91 which serves to close a filler opening through which lubricant may be introduced to the interior of the tie rod and thus to the moving parts of the yielding device. Discharge of lubricant from the device may be prevented by the provision of a packing 93 in one end of the sleeve 84 and openings 94 are provided in the tie rod to ensure that the interior of the sleeve 84 will be adequately lubricated.

It will be seen that by this construction the two ends of the tie rod are permitted a certain amount of relative longitudinal movement, the one end sliding within the other, and that this movement is resisted by the coil spring 89, the degree of initial compression of the spring being adjusted by threading the sleeve 84 to a greater or less extent within the housing 80.

In an alternative form of the invention the yielding connection in the linkage which associates the two steering wheel assemblies for conjoint movement may be located intermediate either of the steering arms 77 and the associated steering knuckle 31 and is shown more particularly in Figure 9 of the drawings. Thus the knuckle 31 may be provided with an inwardly extending boss 96 receiving a substantially vertically disposed pivot pin 97 on which is fulcrumed the associated steering arm 77. On either side of the point of pivotal support of the arm 77 a coil spring 98 is located, this spring being received in oppositely facing recesses formed in the boss 96 and the adjacent portion of the steering arm 77.

The degree of compression of the springs 98 may be regulated by means of bolts 99 threaded in the steering arms and engaging the ends of the coil springs 98. The function of the device shown in Figure 9 is quite similar to that disclosed in Figure 6, the arrangement permitting some slight inaccuracy in steering design and also damping and preventing the transmission of vibrations between the two road wheels.

It will be observed from the construction thus far described that the wheel suspension is completely and effectively isolated from the frame and the road wheels isolated from each other by means of shock absorbing and vibration damping devices, as the result of which any tendency of the wheels to vibrate in synchronism is effectively prevented.

Referring now to the form of the invention shown in Figure 8 of the drawings, it will be seen that the construction is quite similar to that hereinbefore described with reference to Figures 1 to 4 inclusive with the exception that the torque arms 37 are eliminated, the stresses normally resisted by the torque arms being carried through the substantially longitudinally disposed leaf spring assemblies 102. Each of these leaf spring assemblies is secured at the rear end thereof in a bracket 103 rigid with the associated side frame member and is shackled or otherwise secured at its forward end to the vehicle frame in the conventional manner. Intermediate its ends each leaf spring is also secured to one of the pivoted axles by the usual spring clip 104.

With this construction either wheel assembly may rise and fall about an axis extending through the points of pivotal connection of the associated axle and the rearward end of the associated leaf spring assembly to the vehicle frame, and it will be understood that the steering construction described more specifically with reference to the form of the invention shown in Figures 1 and 2 of the drawings may be employed in the modified arrangement illustrated in Figure 8, the point of connection of the rear end of the steering drag link 68 to the steering drop arm 70 being located in the pivotal axis of the associated wheel assembly.

Conventional shock absorbers 110 may be connected to each of the pivoted axles 20 and 21, these shock absorbers being bolted or otherwise secured to the side frame members adjacent the forward ends of the latter as shown in Figure 3. The usual shock absorber arm 111 extends rearwardly in a substantially horizontal plane and is pivotally connected at 112 to a link 114, the latter being in turn pivotally connected at 116 to a lug 118 projecting from the associated axle. Any movement of the wheel assembly in response to irregularities in the road bed will thereby be communicated to the shock absorber 110 which is designed to function in the conventional manner to resist rapid accelerative displacement of the vehicle wheels

Having thus described the invention, what is claimed as new and desired to be secured by Letters Patent is:

1. In a motor vehicle, the combination with a vehicle frame, of a pair of steerable road wheels disposed at opposite sides of and adjacent one end of the frame, means supporting said wheels for independent substantially vertical movement in arcuate paths about separate axes, a steering drag link operatively connected at one end with one of said wheels, and means pivotally connected with said drag link adjacent the opposite end thereof for operating the same, the pivotal connection between said last named means and said link lying substantially in the axis of movement of the associated wheel.

2. In a motor vehicle, the combination with a vehicle frame, of a pair of steerable road wheels disposed at opposite sides of and adjacent one end of the frame, means supporting said wheels for independent substantially vertical movement in arcuate paths about separate axes, said means comprising a pair of axles, one axle carrying each of said wheels, each of said axles extending transversely of said frame and being pivoted to the latter at a point on that side of the longitudinal center line of said frame remote from the associated wheel, a steering drag link operatively connected at one end with one of said wheels, and means pivotally connected with said drag link adjacent the opposite end thereof for operating the same, the pivotal connection between said means and said link lying substantially in the axis of movement of the associated wheel.

3. In a motor vehicle, the combination with a vehicle frame, of a pair of steerable road wheels disposed at opposite sides of and adjacent on end of the frame, means supporting said wheel for independent substantially vertical movement in arcuate paths about separate axes, said means comprising a pair of axles, one axle carrying each of said wheels, each of said axles extending transversely of said frame and being pivoted to the latter at a point on that side of the longitudinal center line of said frame remote from the associated wheel, a pair of torque arms extending longitudinally of the frame adjacent opposite sides of the latter, each torque arm being operatively connected at its forward end with one of said axles and having adjacent the rearward end thereof an articulated connection with said frame, a steering drag link operatively connected at one end with one of said wheels, and means pivotally connected with said drag link adjacent the opposite end thereof for operating the same, the pivotal connection between said last named means and said link being substantially aligned with the points of connection of the associated axle and torque arm to said frame.

4. In a motor vehicle, the combination with a vehicle frame, of a pair of steerable road wheels disposed at opposite sides of and adjacent one end of the frame, means supporting said wheels for independent substantially vertical movement in arcuate paths about separate axes, said means comprising a pair of axles, one axle carrying each of said wheels, each of said axles extending transversely of said frame and being pivoted to the latter at a point on that side of the longitudinal center line of said frame remote from the associated wheel, a pair of torque arms extending longitudinally of the frame adjacent opposite sides of the latter, each torque arm being operatively connected at its forward end with one of said axles and having adjacent the rearward end thereof an articulated connection with said frame, and yielding means acting between said frame and said axles to resist vertical movement of said axles.

5. In a motor vehicle, the combination with a vehicle frame, of a pair of steerable road wheel assemblies disposed at opposite sides of and adjacent one end of the frame and supported on the latter, steering mechanism operatively connected with one of said wheel assemblies, and means connecting said wheel assemblies for conjoint steering movement, said means including a steering arm associated with each wheel assembly, and a tie rod having articulated connection with said steering arms, one of said steering arms having a yielding connection with the associated wheel assembly.

6. In a motor vehicle, the combination with a vehicle frame, of a pair of steerable road wheel assemblies disposed at opposite sides of and adjacent one end of the frame and supported on the latter, steering mechanism operatively connected with one of said wheel assemblies, and means connecting said wheel assemblies for conjoint steering movement, said means including a steering arm associated with each wheel assembly, and a tie rod having articulated connection with said steering arms, one of said steering arms having a yielding connection with the associated wheel assembly comprising a pivotal connection between said steering arm and said wheel assembly, and elastic means acting between said steering arm and said wheel assembly to resist pivotal movement therebetween.

7. In a motor vehicle, the combination with a vehicle frame, of a pair of steerable road wheels disposed at opposite sides of and adjacent one end of the frame, means supporting said wheels for independent substantially vertical movement in arcuate paths about separate axes, said means comprising a pair of axles, one axle carrying each of said wheels, each of said axles extending transversely of said frame and being pivoted to the latter for movement about horizontal and vertical axes, means supporting each of said wheels on one of said axles for swinging steering movement only with respect thereto, and a pair of torque arms extending longitudinally of the frame, each of said torque arms being pivotally connected adjacent the rearward end thereof to the frame for movement about horizontal and vertical axes and being pivotally connected adjacent the forward end to one of said axles for movement about a substantially vertical axis only.

8. In a motor vehicle, the combination with a vehicle frame, of a pair of steerable road wheel assemblies disposed at opposite sides of and adjacent one end of the frame, means supporting said wheel assemblies for independent rising and falling movement, said supporting means including an element operatively connected with each of said wheel assemblies, said element extending generally transversely of the frame and being pivotally supported on the latter for swinging movement in a substantially vertical plane, means supporting each of said wheel assemblies on one of said elements for steering movement only with respect thereto, a torque arm extending generally longitudinally of the vehicle and having a direct connection with said element and an articulated connection with said frame, said articulated connection including a rubber sheath interposed between and completely isolating said torque arm and frame to damp vibrations, and resilient means acting between said frame and said supporting means to resist rising movement of the wheel assemblies.

CLYDE R. PATON.